US012268223B2

(12) United States Patent
Kashulines et al.

(10) Patent No.: US 12,268,223 B2
(45) Date of Patent: Apr. 8, 2025

(54) SYSTEM, METHOD, AND APPARATUS FOR FUME EXTRACTION

(71) Applicant: MARS, INCORPORATED, McLean, VA (US)

(72) Inventors: Peter Thomas Kashulines, Hackettstown, NJ (US); Alex A. Hanna, Cleveland, TN (US); Rich A. Dipaolo, Hackettstown, NJ (US); Ron Steinhart, Flanders, NJ (US); Elias Taye, Geneva, IL (US)

(73) Assignee: Mars, Incorporated, McLean, VA (US)

( * ) Notice: Subject to any disclaimer, the term of this patent is extended or adjusted under 35 U.S.C. 154(b) by 815 days.

(21) Appl. No.: 17/223,102

(22) Filed: Apr. 6, 2021

(65) Prior Publication Data

US 2022/0312792 A1 Oct. 6, 2022

(51) Int. Cl.
*A23G 3/28* (2006.01)
*B01D 53/04* (2006.01)
*B01D 53/44* (2006.01)
*B01D 53/76* (2006.01)
*B23K 26/00* (2014.01)
(Continued)

(52) U.S. Cl.
CPC ........... *A23G 3/28* (2013.01); *B01D 53/0407* (2013.01); *B01D 53/44* (2013.01); *B01D 53/76* (2013.01); *B23K 26/0006* (2013.01); *B23K 26/16* (2013.01); *B23K 26/362* (2013.01); *B01D 2253/102* (2013.01); *B01D 2257/504* (2013.01);
(Continued)

(58) Field of Classification Search
CPC .... A23G 3/28; B01D 53/44; B01D 2257/504; B01D 2257/708; B01D 2257/80; B23K 26/0006; B23K 26/16; B23K 26/362

USPC ............... 99/451; 219/121.6; 454/49
See application file for complete search history.

(56) References Cited

U.S. PATENT DOCUMENTS

| 4,942,284 A | * | 7/1990 | Etcheparre | ........... B23K 26/123 |
| | | | | 219/121.84 |
| 2014/0131922 A1 | * | 5/2014 | Hildebrand | ........ B23K 26/0884 |
| | | | | 425/150 |

(Continued)

FOREIGN PATENT DOCUMENTS

| CN | 206351300 U | * | 7/2017 |
| CN | 112570887 A | * | 3/2021 |
| JP | 2001259881 A | * | 9/2001 |

*Primary Examiner* — Steven W Crabb
*Assistant Examiner* — Alba T Rosario-Aponte
(74) *Attorney, Agent, or Firm* — Bookoff McAndrews, PLLC (57) ABSTRACT

A system, method, or apparatus for controlling the ignition of a volatile organic compound cloud. The system can include a laser source configured to emit one or more laser beams, one or more fume cells, and a conveyor carrying one or more confectionery products. The system is configured to etch the one or more confectionery products using the one or more laser beams. The etching creates a volatile organic compound cloud above the one or more confectionery products. The system is also configured to control one or more factors of the system, where the one or more factors include at least one of laser power, laser wavelength, geometry of laser beam, etch geometry, or fume extraction air flow. The system is further configured to ignite the volatile organic compound cloud based on the controlled one or more factors.

11 Claims, 10 Drawing Sheets

(51) Int. Cl.
B23K 26/16 (2006.01)
B23K 26/362 (2014.01)
(52) U.S. Cl.
CPC .... *B01D 2257/708* (2013.01); *B01D 2257/80* (2013.01); *B01D 2258/02* (2013.01)

(56) References Cited

U.S. PATENT DOCUMENTS

| | | | |
|---|---|---|---|
| 2016/0193635 A1* | 7/2016 | Mate | B23Q 11/0046 454/63 |
| 2021/0291242 A1* | 9/2021 | Desrochers | B08B 15/023 |
| 2021/0291573 A1* | 9/2021 | Kueckendahl | B08B 15/04 |

* cited by examiner

SYSTEM, METHOD, AND APPARATUS FOR FUME EXTRACTION

TECHNICAL FIELD

This disclosure generally relates to extracting fume created during the manufacturing process of confectionary products.

BACKGROUND

Etching techniques are often used during the manufacturing or production of confectionary products. In particular, etching techniques can be used to create various prints or designs on the confectionary products. One such etching technique can involve the use of laser etching. Laser etching uses laser energy to target, ablate, and remove at least part of a substrate included in a given confectionary product. The ablation of the part of the substrate by the laser causes a fume or cloud composed primarily of the etched material to be formed. This fume or cloud is generally composed of viscous, sticky, and cohesive material that can agglomerate. The agglomerated material can clog exhaust filters and contaminate or heat the surfaces of the various machines used to manufacture or produce confectionary products. For example, the fume or cloud can deposit on a window through which the laser passes, thereby degrading the laser transmission and/or changing the deflective path or reflective path of the laser. In addition, the fume or cloud can be noxious to human operators. Accordingly, there is an ongoing need for a system or method to reduce the concentration of the sticky material formed by the etching of confectionary products.

DESCRIPTION OF EXAMPLE EMBODIMENTS

The terms used in this specification generally have their ordinary meanings in the art, within the context of this disclosure and in the specific context where each term is used. Certain terms are discussed below, or elsewhere in the specification, to provide additional guidance in describing the compositions and methods of the disclosure and how to make and use them.

As used in the specification and the appended claims, the singular forms "a," "an" and "the" include plural referents unless the context clearly dictates otherwise.

As used herein, the terms "comprises," "comprising," or any other variation thereof, are intended to cover a non-exclusive inclusion, such that a process, method, article, system, or apparatus that comprises a list of elements does not include only those elements but can include other elements not expressly listed or inherent to such process, method, article, or apparatus.

In the detailed description herein, references to "embodiment," "an embodiment," "one embodiment," "in various embodiments," "certain embodiments," "some embodiments," "other embodiments," "certain other embodiments," etc., indicate that the embodiment(s) described can include a particular feature, structure, or characteristic, but every embodiment might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, the term "confectionery product" refers to a sweet or dessert edible composition. Confectionery products can include, but are not limited to, cakes, cookies, pies, candies (hard and soft), compressed mints, chewing gums, gelatins, ice creams, sorbets, jams, jellies, chocolates, fudge, fondant, liquorice, taffy, and combinations thereof. The "confectionary product," for example, can include one or more substrates, such as a sucrose based substrate. In certain non-limiting embodiments, the "confectionary product" can include at least one of an organic compound or an inorganic compound.

As used herein, the term "fume cell" refers to any apparatus having one or more walls that can at least partially surround the fume or cloud created during etching of a given confectionary product. The wall, for example, can be composed of metal, ceramic, or any other material capable of withstanding the heat of the laser etching, or the heat of the fume or cloud created by the laser etching process.

As used herein, the terms "cloud" or "fume" refer to an ablated material resulting from the laser etching of one or more substrates of the "confectionary product." In certain non-limiting embodiments, laser etching of a sucrose based substrate can generate a "cloud" or "fume". The "cloud" or "fume" can be a volatized and micron sized volatile organic compound (VOC), which can include a thermally degraded product of the one or more substrates or substrate material, and/or one or more unaltered substrates entrained therein. For example, the VOC can include a thermal degradation product of sucrose. In some non-limiting embodiments, the "cloud" or "fume" can have a temperature of 50° C.-750° C., 100° C.-700° C., 200° C.-600° C., 250° C.-550° C., 500° C.-600° C., 500° C.-550° C., or any other temperature. In certain non-limiting embodiments, the temperature of the "cloud" or "fume" can be a temperature in which a "fume" or "cloud" falling below a Minimum Explosive Concentration (MEC) does not ignite. The MEC can be based on the amount of air within a given "fume" or "cloud".

Laser etching of one or more confectionary products can lead to the formation of a fume or cloud of organic or inorganic material suspended in the air above the etched product. In certain non-limiting embodiments, the fume or cloud can be removed using one or more mechanical filters. For example, the one or more mechanical filters can be a carbon filter or any other type of filter known in the art. The cloud or fume can clog such mechanical filters, thereby increasing the frequency in which such filters are replaced. In another non-limiting embodiments, activated carbon can be used to remove volatile organics in the fume or cloud. The activated carbon should be replaced or regenerated upon saturation, leading to increase cost and energy consumption. In some other non-limiting embodiments, combustion of the cloud or fume can be facilitated downstream using one or more incinerators. Such downstream combustion utilizes an additional amount of natural gas or other fuel sources to achieve a combustible concentration range in the one or more incinerators, as well as to additional gas needed to move the fume or cloud downstream.

In certain non-limiting embodiments, a controlled ignition of the "fume" or "cloud" can be used to reduce the concentration or amount of VOC produced during the manufacturing or processing of the confectionary product and/or the amount of VOC that needs to be removed by a downstream filter. In a controlled ignition, the VOC can be heated using laser energy, such as the laser energy used during laser etching of a confectionary product. This controlled ignition, for example, can help to convert at least part of the VOC to carbon dioxide and water, which can be less burdensome to remove than the VOC. The water can take the form of steam or mist. The controlled ignition can convert between 10% to 100% of the VOC to carbon dioxide and water, preferably 50% or greater. In some non-limiting embodiments, the remaining or residual VOC that did not combust can be captured by other downstream filter, such as a carbon filter. In other non-limiting embodiments, the remaining or residual VOC that did not combust can be further reduced or removed using a catalytic converter.

In some non-limiting embodiments, the controlled ignition can be based on one or more of laser power, laser wavelength, geometry of laser beam, etch geometry, geometry of fume cell, temperature profile of the fume cell, and/or fume extraction air flow. The fume extraction air flow can be based on the geometry of the fume cell. The geometry of the fume cell, for example, can include at least the placement and shape of the exhaust hold and/or the placement and shape of the fresh air supply hole.

The controlled ignition, in some non-limiting embodiments, can achieve an ignition rate that can help to facilitate the conversion of the VOC to carbon dioxide and water. For example, a VOC having a methane per volume at standard room temperature and pressure between 2.5%-17%, 5%-17%, 7%-15%, 9%-13%, 10%-12%, 0%-50%, 25%-75%, or 0%-100% can help to achieve a conversion of the VOC to carbon dioxide and water. In other examples, 4.4% methane by volume can represent the lower explosive/flammable limit of the VOC, while 16.4% methane by volume can represent the upper explosive/flammability limit of the VOC. The upper explosive/flammability limit, for example, can be between 3 to 4 times larger than the lower explosive/flammable limit. Below the lower explosive/flammable limit of the VOC can be too lean or non-explosive to be ignited. Similarly, above the upper explosive/flammable limit of the VOC can be too rich or non-explosive to be ignited. In some non-limiting embodiments, the lower explosive/flammable limit can range from 10 grams per cubic meter to 500 grams per cubic meter.

In certain non-limiting embodiments, the MEC can be the units of grams of combustible aerosol materials per cubic meter of air of the VOC. The MEC, for example, can range from 20 grams/cubic meter to 554 grams/cubic meter. In another example, which can be based on methane having a standard room temperature and pressure (STP) density of 554 g/cubic meter and a 4.4% lower explosion limit, the MEC can be 24.4 grams/cubic meter. The fume concentration can be highest above the ablated surface where the VOC are ejected. The cloud or fume can then be diluted as it blends with the air flow, also referred to as a fume extraction sweep gas. In some non-limiting embodiments, the fume or cloud can be concentrated at a location where the laser comes into contact with substrate. In embodiments in which the fume or cloud is too concentrated, ignition can be difficult to achieve. Accordingly, in certain non-limiting embodiments, a glow plug can be used to help ignite the VOC.

In some non-limiting embodiments, the manufacturing of processing system of the confectionary products can be configured to etch the one or more confectionary products using the one or more laser beams. The etching can create a VOC cloud above the one or more confectionary products. The system can also be configured to control one or more factors of the system. The one or more factors can include at least one of laser power, laser wavelength, geometry of laser beam, etch geometry, or fume extraction air flow. The system can be used to ignite the VOC cloud based on the controlled one or more factors. Further, the geometry of fume cell and the temperature profile of the fume cell can also be used to control the ignition of the VOC cloud. The VOC cloud can be ignited and converted to carbon dioxide and water. The remaining VOC cloud that has not combusted can then be filtered from the system using one or more mechanical filters. In other embodiments, one or more of the remaining VOC cloud that has not been combusted, carbon dioxide, and/or water can be filtered using one or more mechanical filters.

Figure 1:
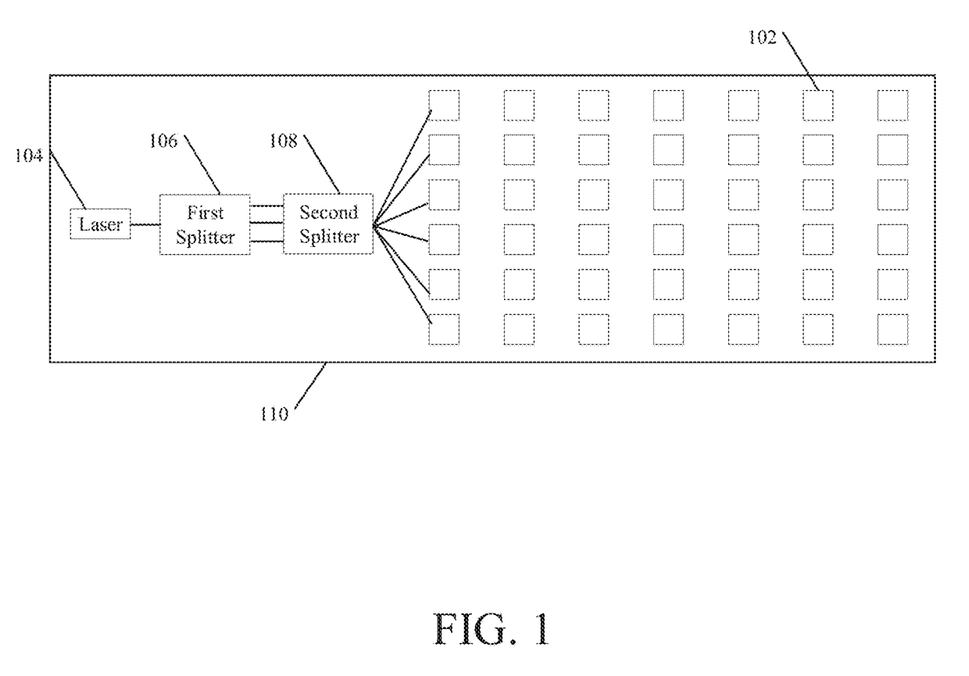
FIG. 1 illustrates an example of laser etching of confectionary products according to certain non-limiting embodiments.

FIG. 1 illustrates an example of laser etching of confectionary products according to certain non-limiting embodiments. In particular, FIG. 1 illustrates confectionary products 102 being moved on a conveyor 110. The conveyor velocity, for example, can range from 0 to 100 feet per minute (ft/min), such as 72 ft/min. A laser beam emanating from laser source 108 can then be split into one or more laser beams used to etch the confectionary product. For example, a first laser beam splitter 106 can split the beam produced from laser source 104 into three separate beams. Each of the three separate beams can then be split into four separate beamlets using second splitter 108. Accordingly, splitters 106 and 108 can split the original beam emanating from laser source 104 into twelve beams (not shown in FIG. 1), with each of the beams being used to etch one or more confectionary products. In other embodiments, one or more splitters can be used to split the laser beam emanating from laser source 104 into 1-100 laser beams, 1-50 laser beams, 1-20 laser beams, 5-20 laser beams, 5-15 laser beams, 5-10 laser beams, or 10-15 laser beams. Each laser beamlet can have a diameter between 10-1000 microns (μm), such as 100 μm, 150 μm, 200 μm, 250 μm, 280 μm, 300 μm, and 350 μm.

The laser can be a lower powered or a high powered laser. The output power of the laser can have a power between 0.01-10 kilowatts (KW), such as, 0.15 KW, 0.5 KW 1 KW, 2 KW, 4 KW, 5 KW, or 10 KW. The wavelength of the laser can be between 5-15 microns (μm), such as, 9.3 μm, 9.6 μm, 10.2 μm, 10.3 μm, or 10.6 μm. In certain non-limiting embodiments the laser can be a gas laser, such as a carbon dioxide laser, a carbon monoxide laser. In other non-limiting embodiments the laser can be a chemical laser, a dye laser, a metal-vapor laser, a solid-state laser, a semiconductor laser, a free-electron laser, or any other laser known in the art. In certain non-limiting embodiments the beams of the laser can maintain a 0.25 inch clearance from the one or more vanes and the side walls of the upper section of the fume cell.

Figure 2:
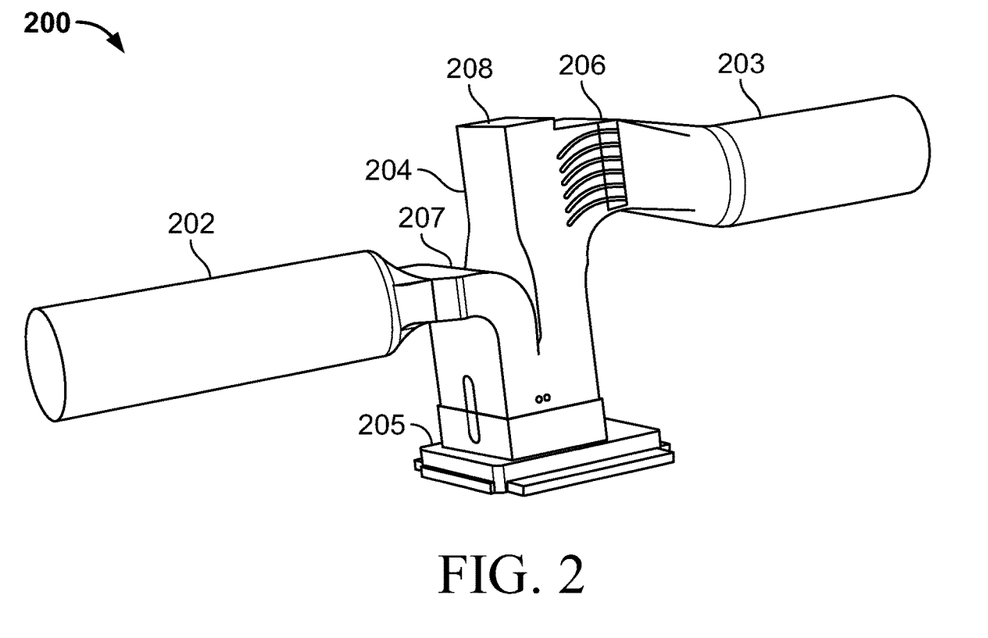
FIG. 2 illustrates a perspective view of an example fume cell according to certain non-limiting embodiments.

The laser etching shown in FIG. 1 can produce a VOC located above the confectionary products. To help control the ignition of the VOC, and to achieve an ignition rate that can facilitate the conversion of the VOC to carbon dioxide and water, a fume extraction cell, also referred to as a fume cell, can be placed above conveyor 110. The fume cell can contain at least part of the VOC. FIG. 2 illustrates a perspective view of an example fume cell 200 according to certain non-limiting embodiments. Fume cell 200 can include a base 205 and an upper section 204. The upper section 204 of fume cell 200 can be connected to base 205. For example, upper section 204 can be connected to base 205 via one or more screws, nuts, bolts, or any other known connectors. The nuts, in certain non-limiting embodiments, can be loosened to allow telescoping of upper section 204 into base 205.

Fume exhaust 202 and air inlet 203 can be attached or connected to upper section 204. In certain non-limiting embodiments, air inlet 203 is located above fume exhaust 202. At least fume exhaust 202 and air inlet 203 can be welded to upper section 204 using connection section 206, which can also be referred to as a first connection. Section 206 connecting air inlet 203 and upper section 204 can be a different shape than the remaining air inlet 203. For example, section 206 can be rectangular or square, while air inlet 203 can be circular or oval. Air inlet 203 can have a diameter of 1 inches to 24 inches, such as 3 inches, 6 inches, 9 inches, 12 inches, 15 inches, or 18 inches. In certain non-limiting embodiments, section 206 can be connected to air inlet 203 using a pull-ring with sealant, push-in pipes connection, loose flange connection, slip-over flange connection, bolted flange connection, or any other connection known to connect one or more pipes in the art.

As shown in FIG. 2, section 206 can include one or more air turning vanes, also referred to as vanes. The vanes, for example, can be cylindrically rolled so that the vanes are angled at the inlet and discharged parallel to the desired air stream. The vanes can be angled, for example, greater than or equal to 110° and less than 180°. For example, the vanes can be angled at 130°, 135°, 140°, 145°, 150°, 155°, 160°, 165°, or 170°. The vanes can be attached or connected to upper section 204 or section 206. In some non-limiting embodiments, one or more vanes can be welded to one or more strips bolted into a duct located in upper section 204.

The vanes can be geometry designed to maximize the smooth flow of air through the system and/or minimize pressure drop. In some non-limiting embodiments, the geometry of the vanes can be determined by accounting for the computational fluid dynamics and balanced with the geometric constraints of the entire system.

Fume exhaust 202 can be connected or attached to upper section 204 using connection 207, which can be referred to as a second connection. Connection 207 can be welded or otherwise attached to fume exhaust 202 and/or upper section 204. For example, connection 207 can be connected to air inlet 202 using a pull-ring with sealant, push-in pipes connection, loose flange connection, slip-over flange connection, bolted flange connection, or any other connection known to connect one or more pipes in the art In certain non-limiting embodiments, connection 207 can have a different shape than fume exhaust 202. Connection 207 can be rectangular or square, for example, while fume exhaust 202 can be circular or oval. Fume exhaust 202 can have a diameter of 1 inches to 24 inches, such as 3 inches, 6 inches, 9 inches, 12 inches, 15 inches, or 18 inches. In some non-limiting embodiments, connection 207 can be connected to fume exhaust 202 using a pull-ring with sealant, push-in pipes connection, loose flange connection, slip-over flange connection, or any other connection known to connect one or more pipes in the art.

In certain non-limiting embodiments, connection 207 can be symmetrical and centered, facilitating the transition from the rectangular opening to upper section 204 to a round or oval fume exhaust 202. Connection 207, therefore, can a uniform shape, or can be divided into multiple sections having one or more same or different shapes. For example, the lower half of connection 207 can be rectangular, the middle section connecting the lower half to the upper half can include a rounded transition with a tight turning radius, and the upper half can be cone shaped. The opening at the lower half of connection 207 can be ⅓ of the area of the opening of fume exhaust 202.

As shown in FIG. 2, fume cell 200 can include an opening 208 located at the top of the full cell. In some non-limiting embodiments the one or more beamlets can be emitted through opening 208 to etch one or more confectionary products. Opening 208 of fume cell 200 can be rectangular, oval, circular, square, or any other shape. The bottom surface of base 205 can include one or more openings through which the one or more beamlets can be emitted.

In some non-limiting embodiments, a window can be included in fume cell 200. The window, for example, can be made of heat resistance material and can allow a user to look into fume cell 200. For example, the window can absorb a stray laser beam of designated wave length and power so as to not exceed predetermined safety values. The window can be located on any surface of the fume cell, such as the side surface of the fume cell. For example, the window can be located on the side wall of base 205. In certain non-limiting embodiments, the length and/or width of the window can range from 1 to 6 inches. In one particular embodiment the window can be 4 inches in length by 4 inches in width.

Figure 3:
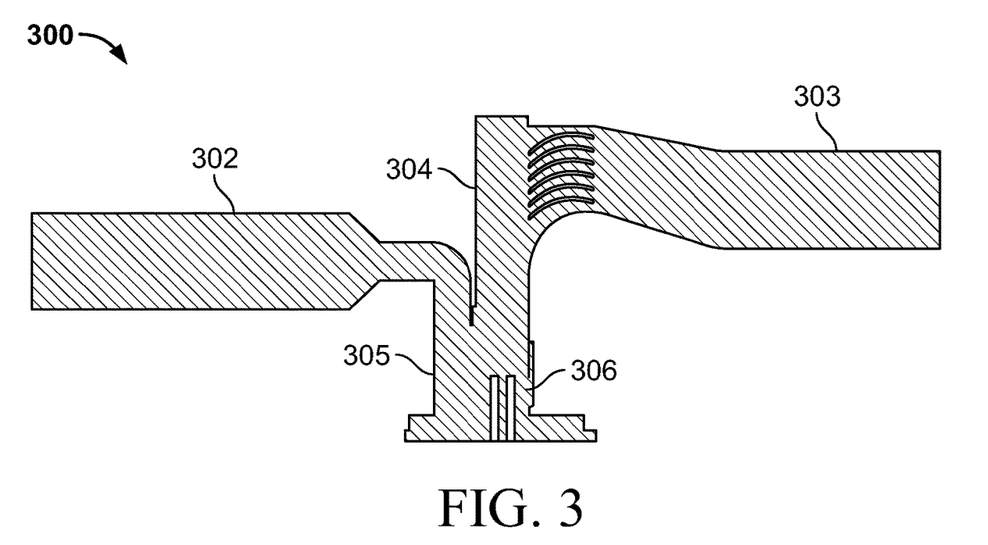
FIG. 3 illustrates a side view of an example fume cell according to certain non-limiting embodiments.

FIG. 3 illustrates a side view of an example fume cell according to certain non-limiting embodiments. In particular, fume cell 300 can include base 305 and upper section 304. Fume exhaust 302 and air inlet 303 can both be attached or connected to upper section 304. Fume cell 300 can also include one or more openings 306 located at the bottom surface of base 305 through which the one or more beamlets can be emitted. In certain non-limiting embodiments, fume cell 300 can at least partially contain VOC. By containing the VOC, fume cell 300 can help to facilitate the controlled ignition of the VOC, thereby converting at least part of the VOC to carbon dioxide and water. In some non-limiting embodiments, the total height of the fume cell can be between 8 inches to 12 inches. In other non-limiting embodiments, the total height of the fume cell can be between 5 to 25 inches, 5 to 10 inches, 5 to 15 inches, 10 to 15 inches, and/or 15 to 20 inches. The outside width of base 305 can be between 3 to 6 inches, such as 4.46 inches, while the inside width of base 305 can be between 3 to 6 inches, such as 4.34 inches. The height of fume cell 300, in certain non-limiting embodiments, can be determined based on the focal distance of the laser, with the focal distance being the distance between the laser aperture and the product bed. The height of the fume cell can be adjusted to achieve an air flow that maintains the combustion of the cloud or fume and/or protects one or more components of fume cell 300 (e.g., a window included in fume cell 300).

Figures 4A, 4B:
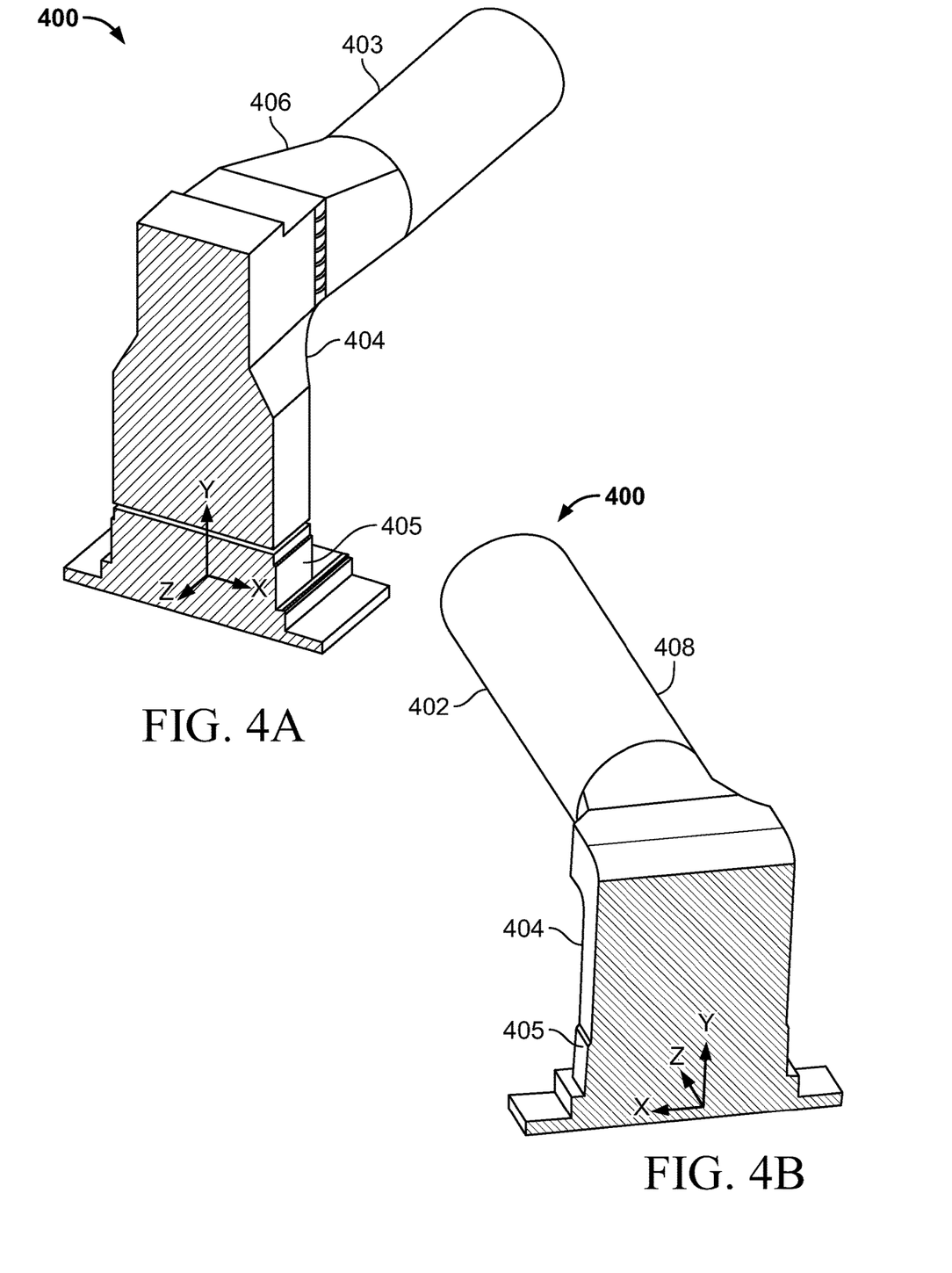
FIG. 4A illustrates a perspective view of an example first part of fume cell according to certain non-limiting embodiments.
FIG. 4B illustrates a perspective view of an example second part of fume cell according to certain non-limiting embodiments.

FIG. 4A illustrates a perspective view of an example first part of fume cell according to certain non-limiting embodiments. In particular, FIG. 4A illustrates an example of a first half of fume cell 400 connected to air inlet 403 via section 406. Fume cell 400 includes base 405 and upper section 404. FIG. 4B illustrates a perspective view of an example second part of fume cell according to certain non-limiting embodiments. In particular, FIG. 4B illustrates an example of a first half of fume cell 400 connected to fume exhaust 402 via connection 408. Fume cell 400 includes base 405 and upper section 404.

Figure 5:
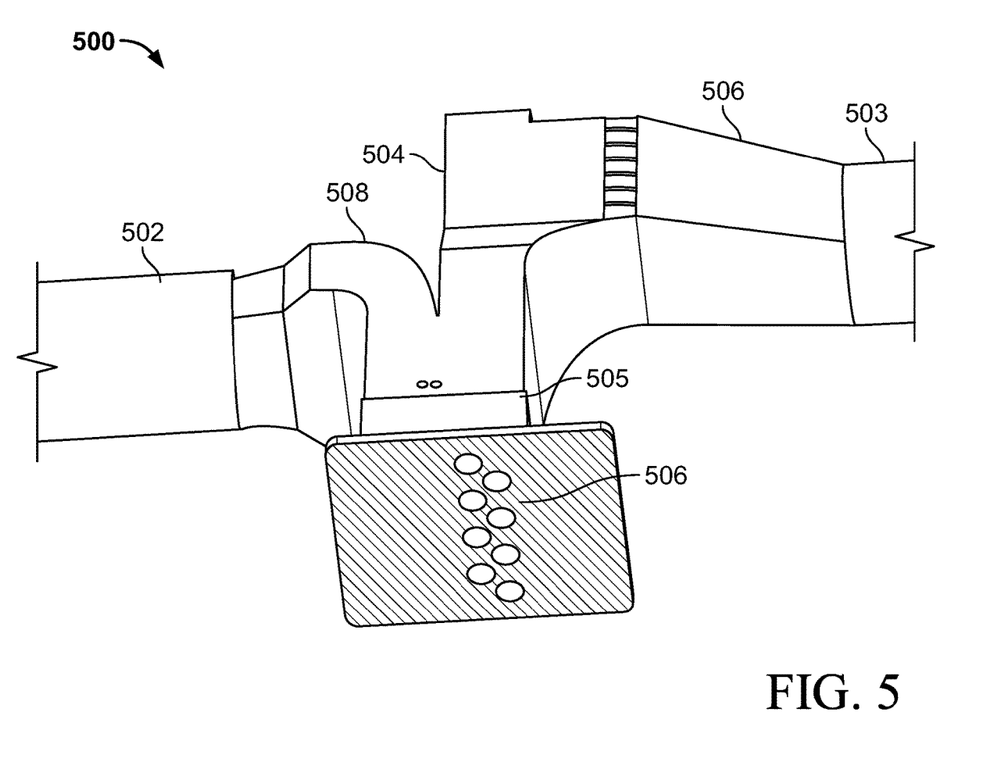
FIG. 5 illustrates a perspective view of an example fume cell according to certain non-limiting embodiments.

FIG. 5 illustrates a perspective view of an example fume cell according to certain non-limiting embodiments. In particular, FIG. 5 illustrates an example of a fume cell 500 connected to air inlet 503 via section 506 and to fume exhaust 502 via connection 508. Fume cell 500 also includes base 505 and upper section 504. The bottom surface of base 505 can include one or more holes 506 through which one or more laser beamlets emanate. For example, base 505 can include eight holes 506 with one or more beams emanating through each hole. The one or more holes 506, for example, can have a diameter between 5 millimeters to 2 inches. In some non-limiting embodiments, at least part of the bottom surface of base 505, which includes the one or more holes 506, can be indented towards the inside of the fume cell in order to provide additional clearance for the VOC. The bottom surface of base 505 can be indented by 0.5 inches, 1 inch, 2 inches, 3 inches, 4 inches, 5 inches, or any other value between 0.1 inches to 5 inches.

Figure 6:
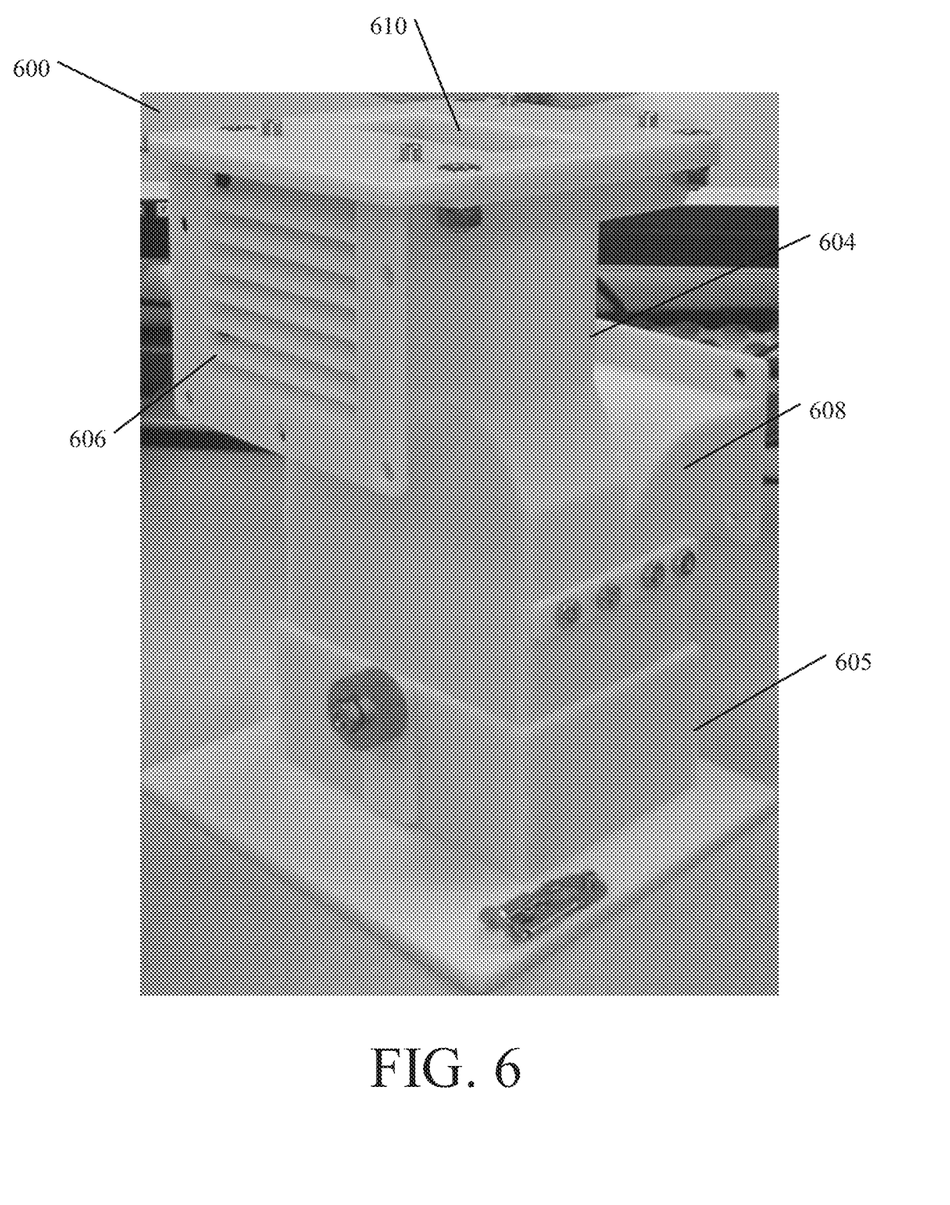
FIG. 6 illustrates a perspective view of an example fume cell according to certain non-limiting embodiments.

FIG. 6 illustrates a perspective view of an example fume cell according to certain non-limiting embodiments. In particular, FIG. 6 illustrates fume cell 600 not connected to air inlet or fume exhaust. Fume cell 600 includes section 606, connection 608, base 605, upper section 604, and opening 610. Base 605 is connected to upper section 604 via one or more bolts and nuts. As shown in FIG. 6, section 606 includes six separate vanes. One or more laser beamlets can be emitted through opening 610.

Figure 7A:
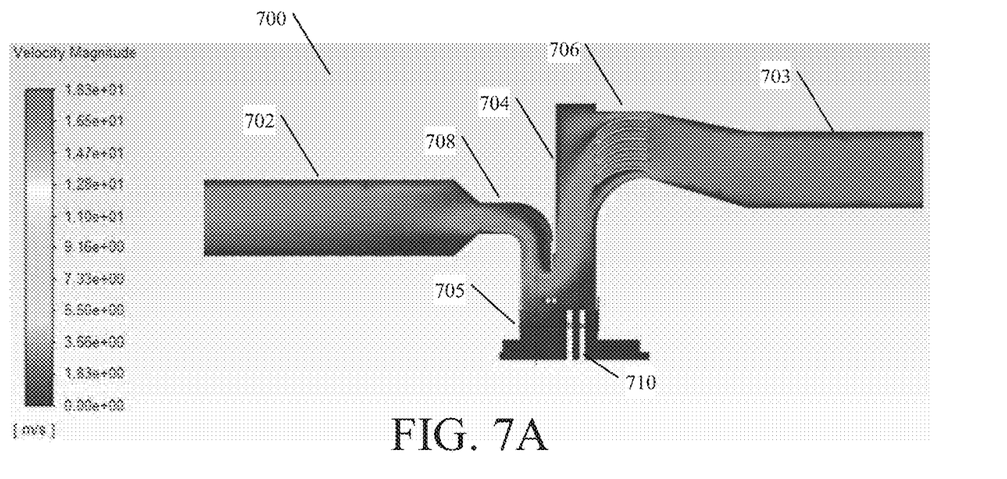
FIG. 7A illustrates a velocity heatmap of the air flow through an example fume cell according to certain non-limiting embodiments.
Figure 7B:
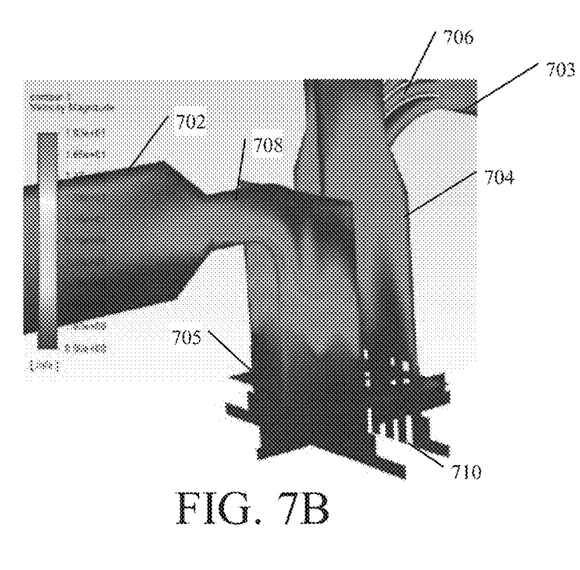
FIG. 7B illustrates a velocity heatmap of the air flow through an example fume cell according to certain non-limiting embodiments.

FIGS. 7A and 7B illustrate velocity heatmaps of the air flow through an example fume cell according to certain non-limiting embodiments. The air flow can be used to provide oxygen for combustion of the VOC and/or move the remaining uncombusted VOC, carbon dioxide, and water downstream where one or more of the VOC, carbon dioxide, and water can be removed via a mechanical filter. In certain non-limiting embodiments, the air flow can be used to control or define the temperature of exhaust by removing heat emitted from the VOC combustion from the system. In other non-limiting embodiments, the air flow can provide temperature control, ensure combustion of the VOC, maintain cleanliness of the exhaust, and/or minimize pressure drop. The mechanical filters, for example, can be a carbon filter. In particular, FIGS. 7A and 7B illustrate fume cell 700 including upper section 704 and base 705. Air inlet 703 is connected to upper section 704 via section 706, while fume exhaust 702 is connected to upper section 704 via connection 708. One or more holes 710 are cut through the bottom surface of base 705. In certain non-limiting embodiments, one or more holes 710 can be one or more columns or cylinders which represent the size of the ignited fume cloud. One or more holes 710 can be used as a heat input area to calculate the temperatures of the air stream. In some non-limiting embodiments, the confectionary product being etched can be contained within the circular area defined by the bottom of one or more holes 710.

As shown in FIGS. 7A and 7B, fresh air enters through air inlet 703, passes through section 706 towards base 705, and proceeds to fume exhaust 702 through connection 708. The air flow is highest near section 708, where the VOC, carbon dioxide, and water are removed to the fume exhaust 702. For example, the air flow can range from 0 meters per second (m/s) to 20 m/s, preferably between 1.83 m/s to 18.3 m/s. In another example, the average air flow velocity can be maintained below 10 m/s to minimize pressure drop. In some non-limiting embodiments, the volumetric air flow can be used to control combustion of the VOC. For example, the air flow can be controlled so that the exit exhaust air is 100° C. or below to best protect the laser optics.

Figure 8A:
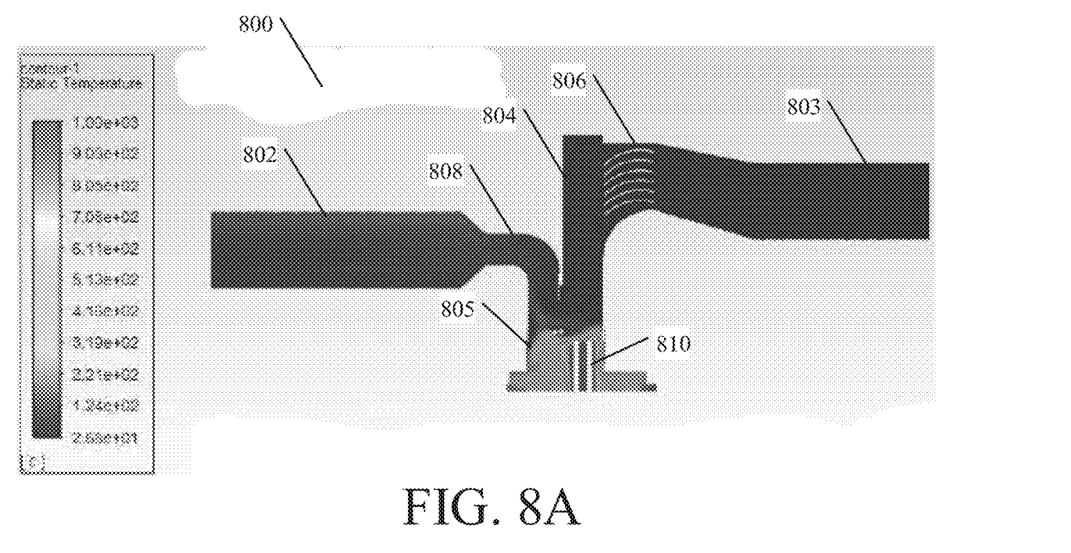
FIG. 8A illustrates a temperature heatmap of the air flow through an example fume cell according to certain non-limiting embodiments.
Figure 8B:
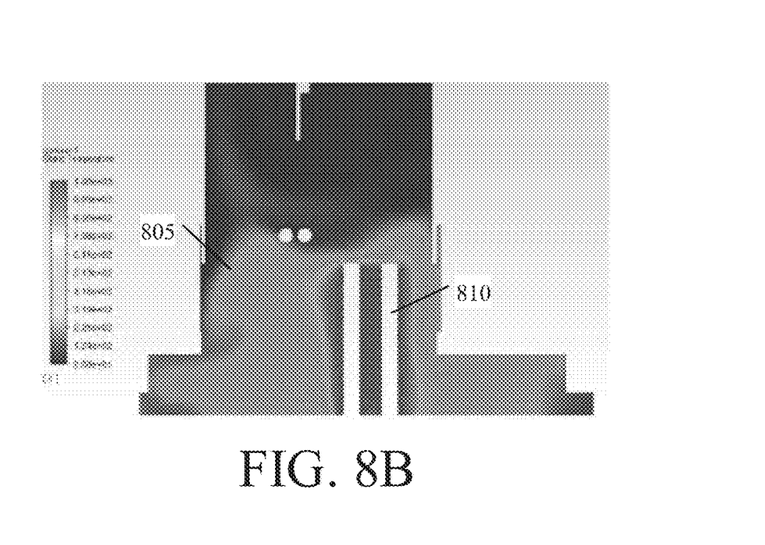
FIG. 8B illustrates a temperature heatmap of the air flow through an example fume cell according to certain non-limiting embodiments.

FIGS. 8A and 8B illustrate temperature heatmaps of the air flow through an example fume cell according to certain non-limiting embodiments. In other words, FIGS. 8A and 8B illustrate a temperature profile of the fume cell. The air flow can be used to move the remaining VOC, carbon dioxide, and water downstream where one or more of the VOC, carbon dioxide, and water can be removed via a mechanical filter. In particular, FIGS. 8A and 8B illustrate fume cell 800 including upper section 804 and base 805. Air inlet 803 is connected to upper section 804 via section 806, while fume exhaust 802 is connected to upper section 804 via connection 808. One or more holes 810 are cut through the bottom surface of base 805. The temperature of the air range in fume cell 800 can range between 26.8° C. to 1000° C. For example, the temperature of the air surrounding one or more holes 810 in base 805, through which the laser beams are emitted, can range between 100° C. to 1000° C., such as 300° C. or above, 350° C. or above, or 500° C. or above. The laser can impart energy for the ablation and/or serve as the ignition to start the combustion of the cloud or fume. In certain non-limiting embodiments in which the confectionary product includes sucrose, the emitted laser beam can have a temperature of 350° C. or above.

Given the high temperatures of the air surrounding one or more holes 810 in base 805, in certain non-limiting embodiments the controlled ignition of the VOC can occur in this location. The high temperature can be the result of added laser energy used to heat up the fume cell to facilitate ignition of the VOC and/or the heat caused by the laser etching of the confectionary products. In some non-limiting embodiments, while the heat caused by laser etching of the confectionary product can cause a part of the VOC ignition, the controlled ignition of the VOC can be facilitated at least by the geometry of fume cell, temperature profile throughout the chamber, and/or fume extraction air flow. The geometry and size of the fume cell, including the location of base 805, upper section 804, air inlet 803, section 806, fume exhaust 802, and connection 808 all partially contribute to the controlled ignition of the VOC.

In certain non-limiting embodiments, the controlled ignition of the VOC can be caused by one or more of the laser power, laser wavelength, geometry of laser beam, etch rate, and/or etch geometry. For example, the total energy of the cell can include an energy of combustion of the confectionary product of 14,200 kilojoule per kilogram (kj/kg), the etch rate can be 0.000186 kilograms per second (kg/sec), and the laser energy can be 0.666 KW. Accordingly, the total energy in the fume cell can be 3.3 KW.

Figure 9:
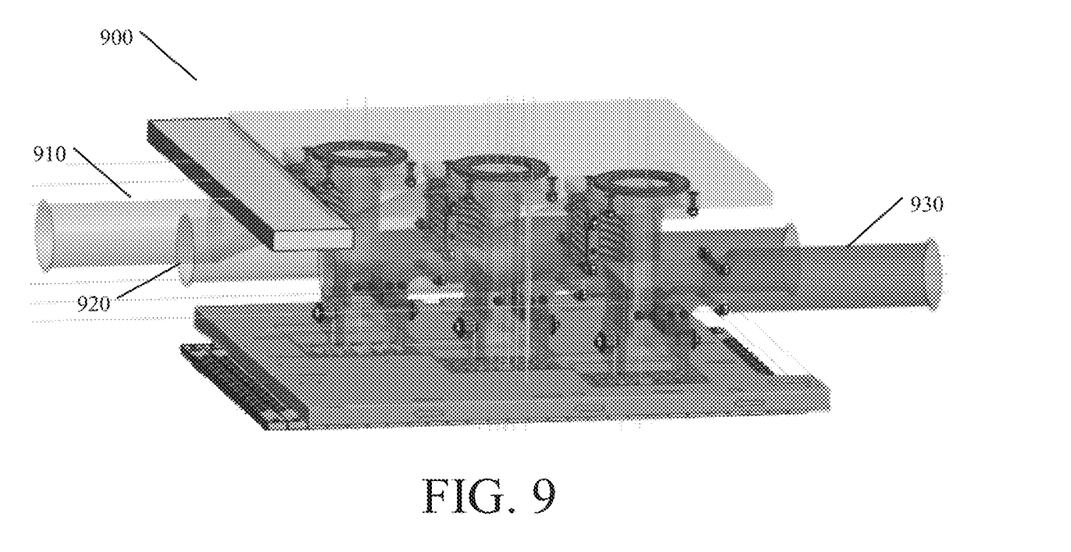
FIG. 9 illustrates an example machine including one or more fume cells according to certain non-limiting embodiments.

FIG. 9 illustrates an example machine including one or more fume cells according to certain non-limiting embodiments. In particular, FIG. 9 illustrates a manufacturing or processing system 900 that includes a plurality of fume cells. For example, manufacturing or processing system 900 can include fume cell 910, fume cell 920, and fume cell 930. In certain non-limiting embodiments the fume cells can be placed diagonally to one another, while in other embodiments the fume cells can be placed in parallel to one another. In some non-limiting embodiments the length of the air inlet pipe for each of fume cells 910, 920, and 930 can be different. Similar, the length of the fume exhaust pipe for each of fume cells 910, 920, and 930 can be different. The air supply plenum to which the fume cells are connected can be square, while the fume exhaust plenum to which the fume cells are connected can also be square.

Figure 10:
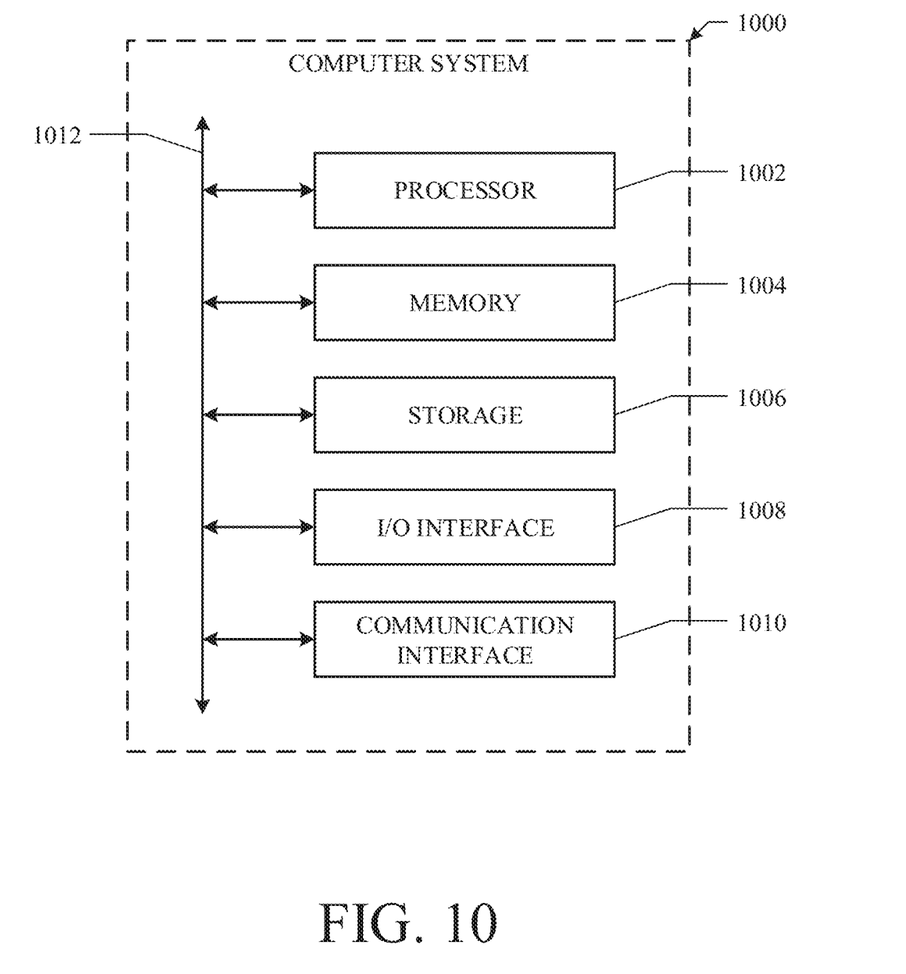
FIG. 10 illustrates an example computer system according to certain non-limiting embodiments.

FIG. 10 illustrates an example computer system 1000 according to certain non-limiting embodiments. In certain non-limiting embodiments, computer system 1000 connected to the manufacturing or processing system can be used to control one or more factors of the controlled VOC ignition. The factors, for example, can include one or more of laser power, laser wavelength, geometry of laser beam, whether the laser is continuous or pulsed, etch geometry, fume extraction air flow, and/or any other relevant factor. The one or more factors, for example, can be used to control the ablation path of the laser, the local VOC concentration, and/or the flammability of the fume or cloud. While FIG. 10 illustrates a single computer system 1000, other non-limiting embodiments can include one or more computer systems. In certain non-limiting embodiments, one or more computer systems 1000 perform one or more steps of one or more methods described or illustrated herein, for example, in FIG. 11. In certain non-limiting embodiments, one or more computer systems 1000 provide functionality described or illustrated herein. In certain non-limiting embodiments, software running on one or more computer systems 1000 performs one or more steps of one or more methods described or illustrated herein or provides functionality described or illustrated herein. Certain non-limiting embodiments include one or more portions of one or more computer systems 1000. Herein, reference to a computer system 1000 can encompass a computing device, and vice versa, where appropriate. Moreover, reference to a computer system 1000 can encompass one or more computer systems, where appropriate.

This disclosure contemplates any suitable number of computer systems 1000. This disclosure contemplates computer system 1000 taking any suitable physical form. As example and not by way of limitation, computer system 1000 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 can include one or more computer systems; be unitary or distributed; span multiple locations; span multiple machines; span multiple data centers; or reside in a cloud, which can include one or more cloud components in one or more networks. Where appropriate, one or more computer systems 1000 can perform without substantial spatial or temporal limitation one or more steps of one or more methods described or illustrated herein. As an example and not by way of limitation, one or more computer systems 1000 can perform in real time or in batch mode one or more steps of one or more methods described or illustrated herein. One or more computer systems 1000 can perform at different times or at different locations one or more steps of one or more methods described or illustrated herein, where appropriate.

In certain non-limiting embodiments, computer system 1000 includes a processor 1002, memory 1004, storage 1006, an input/output (I/O) interface 1008, a communication interface 1008, and/or a bus 1012. Although this disclosure describes and illustrates a particular computer system 1000 having a particular number of particular components in a particular arrangement, this disclosure contemplates any suitable computer system 1000 having any suitable number of any suitable components in any suitable arrangement. In some non-limiting embodiments, one or more components of computer system 1000, such as processor 1002 and/or memory 1004, can be configured to control or determine the explosive or flammable region based on one or more factors or inputs. The one or more factors or inputs can include at least one of laser power, laser wavelength, geometry of laser beam, etch geometry, or fume extraction air flow. In other embodiments, the one or more factors or inputs can be the vapor concentration in the air and/or the temperature within the one or more fume cells.

In certain non-limiting embodiments, processor 1002 includes hardware for executing instructions, such as those making up a computer program. As an example and not by way of limitation, to execute instructions, processor 1002 can retrieve (or fetch) the instructions from an internal register, an internal cache, memory 1004, or storage; decode and execute them; and then write one or more results to an internal register, an internal cache, memory 1004, or storage. In certain non-limiting embodiments, processor 1002 can include one or more internal caches for data, instructions, or addresses. This disclosure contemplates processor 1002 including any suitable number of any suitable internal caches, where appropriate. As an example and not by way of limitation, processor 1002 can include one or more instruction caches, one or more data caches, and one or more translation lookaside buffers (TLBs). Instructions in the instruction caches can be copies of instructions in memory 1004 or storage, and the instruction caches can speed up retrieval of those instructions by processor 1002. Data in the data caches can be copies of data in memory 1004 or storage for instructions executing at processor 1002 to operate on; the results of previous instructions executed at processor 1002 for access by subsequent instructions executing at processor 1002 or for writing to memory 1004 or storage; or other suitable data. The data caches can speed up read or write operations by processor 1002. The TLBs can speed up virtual-address translation for processor. In certain non-limiting embodiments, processor 1002 can include one or more internal registers for data, instructions, or addresses. This disclosure contemplates processor 1002 including any suitable number of any suitable internal registers, where appropriate. Where appropriate, processor 1002 can include one or more arithmetic logic units (ALUs); be a multi-core processor; or include one or more processors. Although this disclosure describes and illustrates a particular processor 1002, this disclosure contemplates any suitable processor.

In certain non-limiting embodiments, memory 1004 includes main memory 1004 for storing instructions for processor 1002 to execute or data for processor 1002 to operate on. As an example and not by way of limitation, computer system 1000 can load instructions from storage or another source (such as, for example, another computer system) to memory 1004. Processor 1002 can then load the instructions from memory 1004 to an internal register or internal cache. To execute the instructions, processor 1002 can retrieve the instructions from the internal register or internal cache and decode them. During or after execution of the instructions, processor 1002 can write one or more results (which can be intermediate or final results) to the internal register or internal cache. Processor 1002 can then write one or more of those results to memory 1004. In certain non-limiting embodiments, processor 1002 executes only instructions in one or more internal registers or internal caches or in memory 1004 (as opposed to storage or elsewhere) and operates only on data in one or more internal registers or internal caches or in memory (as opposed to storage or elsewhere). One or more memory buses (which can each include an address bus and a data bus) can couple processor 1002 to memory 1004. Bus 1012 can include one or more memory buses, as described below. In certain non-limiting embodiments, one or more memory management units (MMUs) reside between processor 1002 and memory and facilitate accesses to memory requested by processor 1002. In certain non-limiting embodiments, memory 1004 includes random access memory (RAM). This RAM can be volatile memory, where appropriate. Where appropriate, this RAM can be dynamic RAM (DRAM) or static RAM (SRAM). Moreover, where appropriate, this RAM can be single-ported or multi-ported RAM. This disclosure contemplates any suitable RAM. Memory 1004 can include one or more memories where appropriate. Although this disclosure describes and illustrates particular memory 1004, this disclosure contemplates any suitable memory.

In certain non-limiting embodiments, storage 1006 includes mass storage for data or instructions. As an example and not by way of limitation, storage 1006 can include a hard disk drive (HDD), a floppy disk drive, flash memory, an optical disc, a magneto-optical disc, magnetic tape, or a Universal Serial Bus (USB) drive or a combination of two or more of these. Storage 1006 can include removable or non-removable (or fixed) media, where appropriate. Storage 1006 can be internal or external to computer system 1000, where appropriate. In certain non-limiting embodiments, storage is non-volatile, solid-state memory. In certain non-limiting embodiments, storage 1006 includes read-only memory (ROM). Where appropriate, this ROM can be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage taking any suitable physical form. Storage 1006 can include one or more storage control units facilitating communication between processor 1002 and storage 1006, where appropriate. Where appropriate, storage 1006 can include one or more storages. Although this disclosure describes and illustrates particular storage 1006, this disclosure contemplates any suitable storage 1006.

In certain non-limiting embodiments, I/O interface 1008 includes hardware, software, or both, providing one or more interfaces 1008 for communication between computer system 1000 and one or more I/O devices. Computer system 1000 can include one or more of these I/O devices, where appropriate. One or more of these I/O devices can enable communication between a person and computer system 1000. As an example and not by way of limitation, an I/O device can include a keyboard, keypad, microphone, monitor, mouse, printer, scanner, speaker, still camera, stylus, tablet, touch screen, trackball, video camera, another suitable I/O device or a combination of two or more of these. An I/O device can include one or more sensors. This disclosure contemplates any suitable I/O devices and any suitable I/O interfaces for them. Where appropriate, I/O interface 1008 can include one or more device or software drivers enabling processor 1002 to drive one or more of these I/O devices. I/O interface 1008 can include one or more I/O interfaces 1008, where appropriate. Although this disclosure describes and illustrates a particular I/O interface 1008, this disclosure contemplates any suitable I/O interface.

In certain non-limiting embodiments, communication interface 1010 includes hardware, software, or both providing one or more interfaces for communication (such as, for example, packet-based communication) between computer system 1000 and one or more other computer systems or one or more networks. As an example and not by way of limitation, communication interface 1010 can include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 can communicate with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, computer system 1000 can communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 can include any suitable communication interface 1010 for any of these networks, where appropriate. Communication interface 1010 can include one or more communication interfaces, where appropriate. Although this disclosure describes and illustrates a particular communication interface, this disclosure contemplates any suitable communication interface 1010.

In certain non-limiting embodiments, bus 1012 includes hardware, software, or both coupling components of computer system 1000 to each other. As an example and not by way of limitation, bus 1012 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 can include one or more buses, where appropriate. Although this disclosure describes and illustrates a particular bus, this disclosure contemplates any suitable bus or interconnect.

Figure 11:
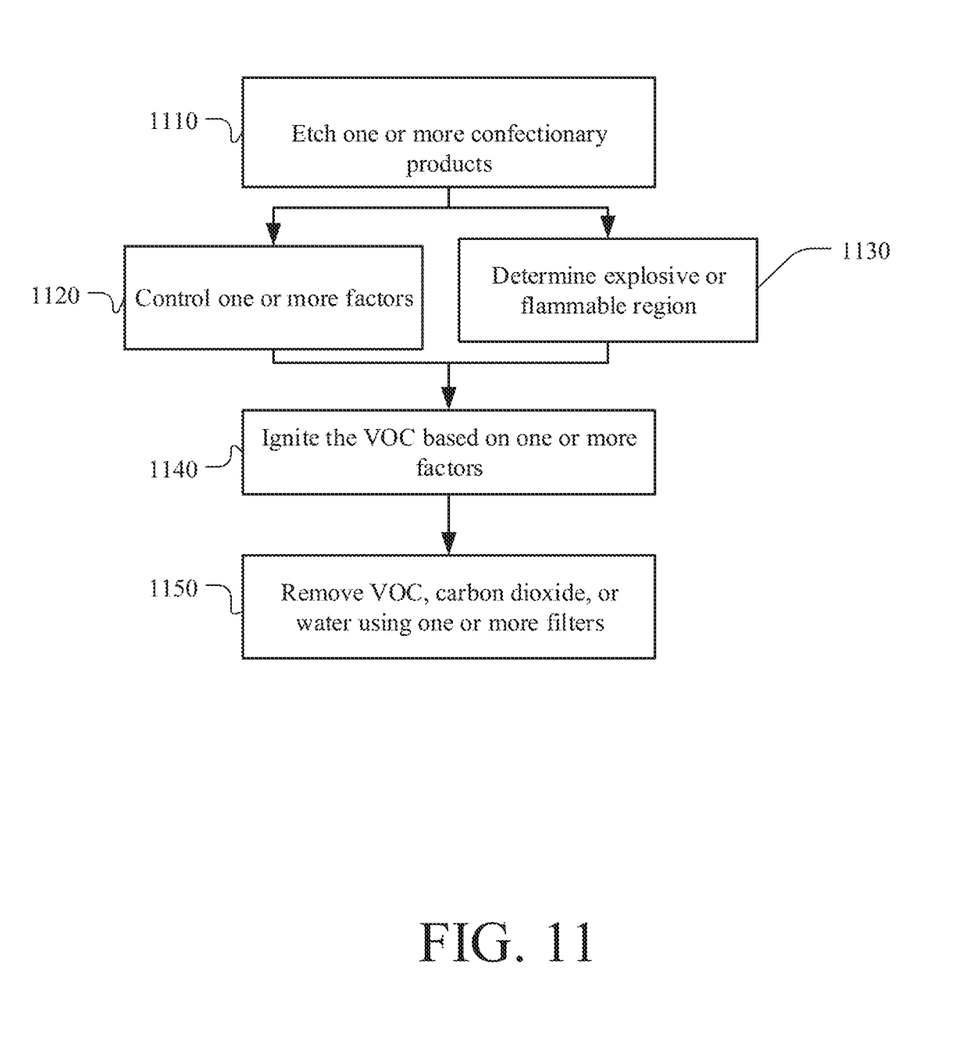
FIG. 11 illustrates an example or process method according to certain non-limiting embodiments.

FIG. 11 illustrates an example method according to certain non-limiting embodiments. The method shown in FIG. 11, for example, can be performed by computer system 1000 of FIG. 10. For example, computer system can control one or more components of a system. The system includes, for example, a laser source configured to emit one or more laser beams and/or a conveyor carrying one or more confectionary products. In step 1110, the system can be configured to etch the one or more confectionary products using the one or more laser beams. The system can also be configured to control one or more factors of the system, as shown in step 1120. For example, the one or more factors include at least one of laser power, laser wavelength, geometry of laser beam, etch geometry, and/or fume extraction air flow. In some non-limiting embodiments, the system can determine the explosive or flammable region based on one or more inputs, as shown in step 1130. The inputs, for example, can be the vapor concentration in the air and/or the temperature within the one or more fume cells. The VOC cloud can be ignited based on the controlled one or more factors, as shown in step 1140. In other non-limiting embodiments, the VOC cloud can be ignited using the determined explosive or flammable region based on the vapor concentration in the air and/or the temperature within the one or more fume cells. In step 1150, the system can remove at least one of the volatile organic compound, the carbon dioxide, and the water using one or more filters.

Herein, a computer-readable non-transitory storage medium or media can include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium can be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments can include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain non-limiting embodiments as providing particular advantages, certain non-limiting embodiments can provide none, some, or all of these advantages.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure.

What is claimed is:

1. A system comprising:
   a laser source configured to emit one or more laser beams;
   one or more fume cells;
   a conveyor carrying one or more confectionery products, wherein the system is configured to:
   etch the one or more confectionery products using the one or more laser beams, wherein the etching creates a volatile organic compound cloud above the one or more confectionery products;
   control one or more factors of the system, wherein the one or more factors include at least one of laser power, laser wavelength, geometry of laser beam, etch geometry, or fume extraction air flow; and
   ignite the volatile organic compound cloud based on the controlled one or more factors,
   wherein a total energy of the one or more fume cells is 3,300 watts,
   wherein the volatile organic compound cloud is ignited at a minimum explosive concentration of 30 grams per cubic meter, or
   wherein the volatile organic compound cloud is ignited at a minimum explosive concentration of 24.4 grams per cubic meter.

2. The system of claim 1, further comprising:
   an air inlet pipe attached to an upper section of the one or more fume cells via a first connection.

3. The system of claim 2, wherein the air inlet pipe is located above a fume exhaust pipe.

4. The system of claim 2, further comprising:
   a fume exhaust pipe attached to the one or more fume cells via a second connection.

5. The system of claim 1, further comprising:
one or more laser splitters, wherein the one or more laser splitters split the one or more laser beams into one or more beamlets.

6. The system of claim 1, wherein the one or more fume cells comprise a base and an upper section, wherein the base and the upper section are attached to one another.

7. The system of claim 1, wherein the one or more fume cells comprise one or more holes through which the one or more laser beams are emitted.

8. The system of claim 1, wherein the volatile organic compound cloud is composed of a thermal degradation product of sucrose.

9. The system of claim 1, wherein the total energy of the one or more fume cells is 3,300 watts.

10. The system of claim 1, wherein the volatile organic compound cloud is ignited at the minimum explosive concentration of 30 grams per cubic meter.

11. The system of claim 1, wherein the volatile organic compound cloud is ignited at the minimum explosive concentration of 24.4 grams per cubic meter.

* * * * *